C. C. Walworth,

Manufacture of Gas Pipe Fittings,

No. 1752, Reissued Aug. 30, 1864

Witnesses.
N. C. Lombard.
J. B. Crosby.

Inventor.
Caleb C. Walworth

C. C. Walworth,

Manufacture of Gas Pipe Fittings,

No. 1752, Reissued Aug. 30, 1864.

Witnesses.
J. P. Lombard
J. B. Crosby.

Inventor
Caleb C. Walworth

C. C. Walworth,

Manufacture of Gas Pipe Fittings,

No. 1752, Reissued Aug. 30, 1864

Witnesses.
N. C. Lombard.
J. Wooby.

Inventor:
Caleb C. Walworth

C. C. Walworth,

Manufacture of Gas Pipe Fittings,

No. 1752, Reissued Aug. 30, 1864.

Witnesses.
A. C. Lombard
B. Boothy.

Inventor.
Caleb C. Walworth.

UNITED STATES PATENT OFFICE.

MALLEABLE IRON FITTINGS COMPANY, OF BRANFORD, CONNECTICUT, ASSIGNEES, BY MESNE ASSIGNMENTS, OF CALEB C. WALWORTH.

IMPROVEMENTS IN MACHINES FOR FINISHING GAS-PIPE FITTINGS.

Specification forming part of Letters Patent No. 15,860, dated October 7, 1856; Reissue No. 1,752, dated August 30, 1864.

*To all whom it may concern:*

Be it known that CALEB C. WALWORTH, of the city of Boston, in the county of Suffolk and State of Massachusetts, invented a new and Improved Machine for Tapping, Screwing, Boring, and Turning Steam and Gas Pipe Fittings, of which the following is a full, clear, and exact description, taken in connection with the accompanying drawings and the characters of reference thereon marked.

Figure 1:
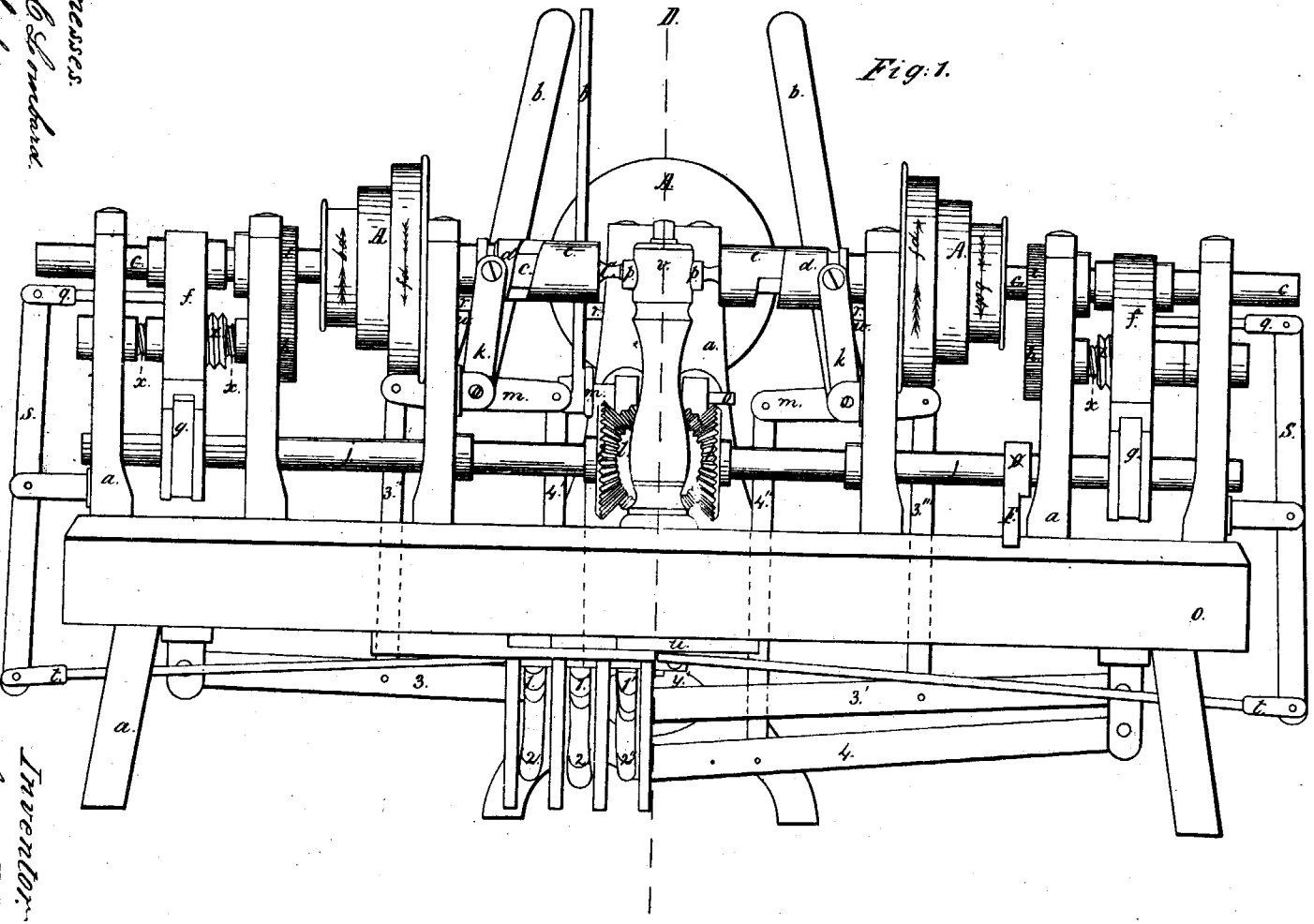
Figure 2:
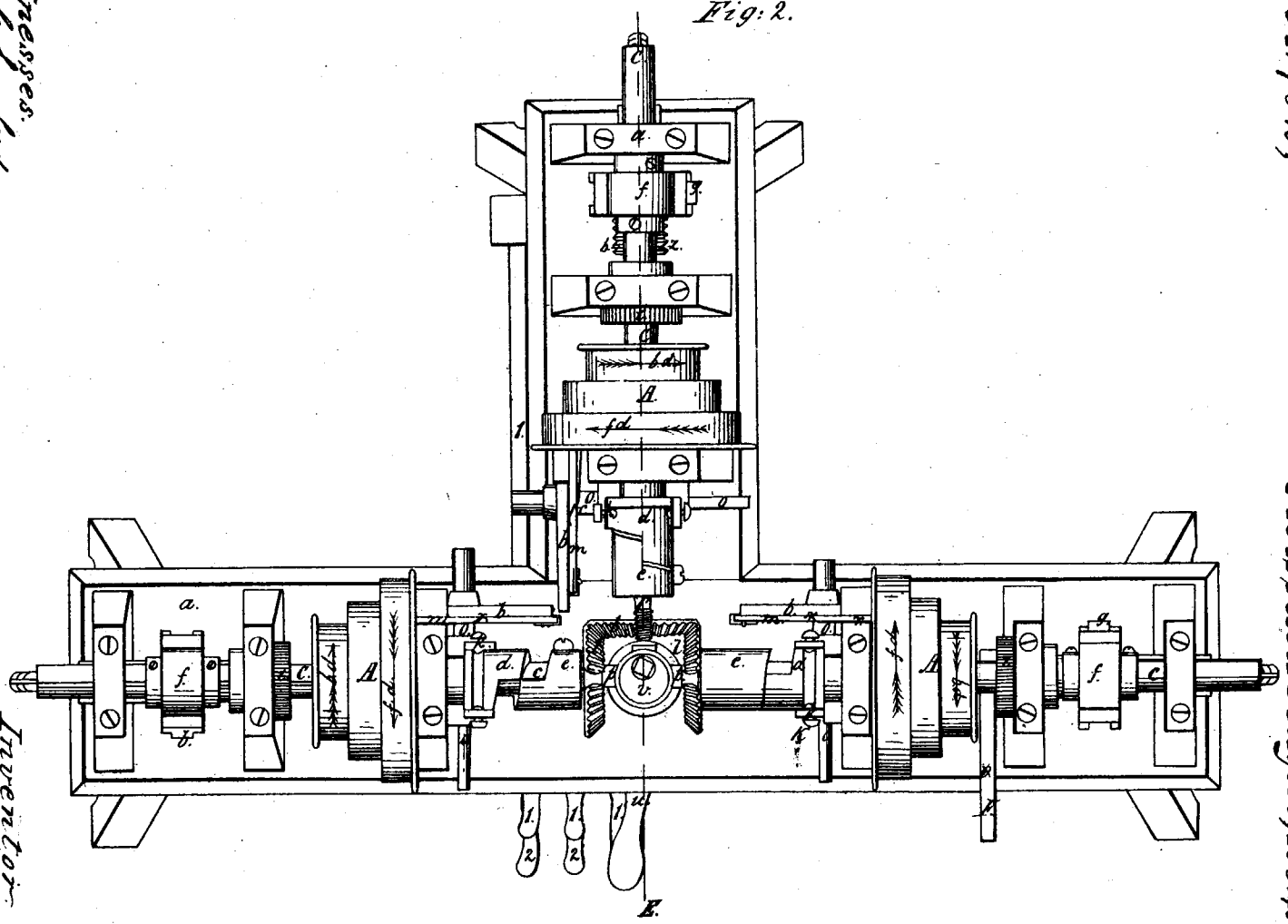
Figure 3:
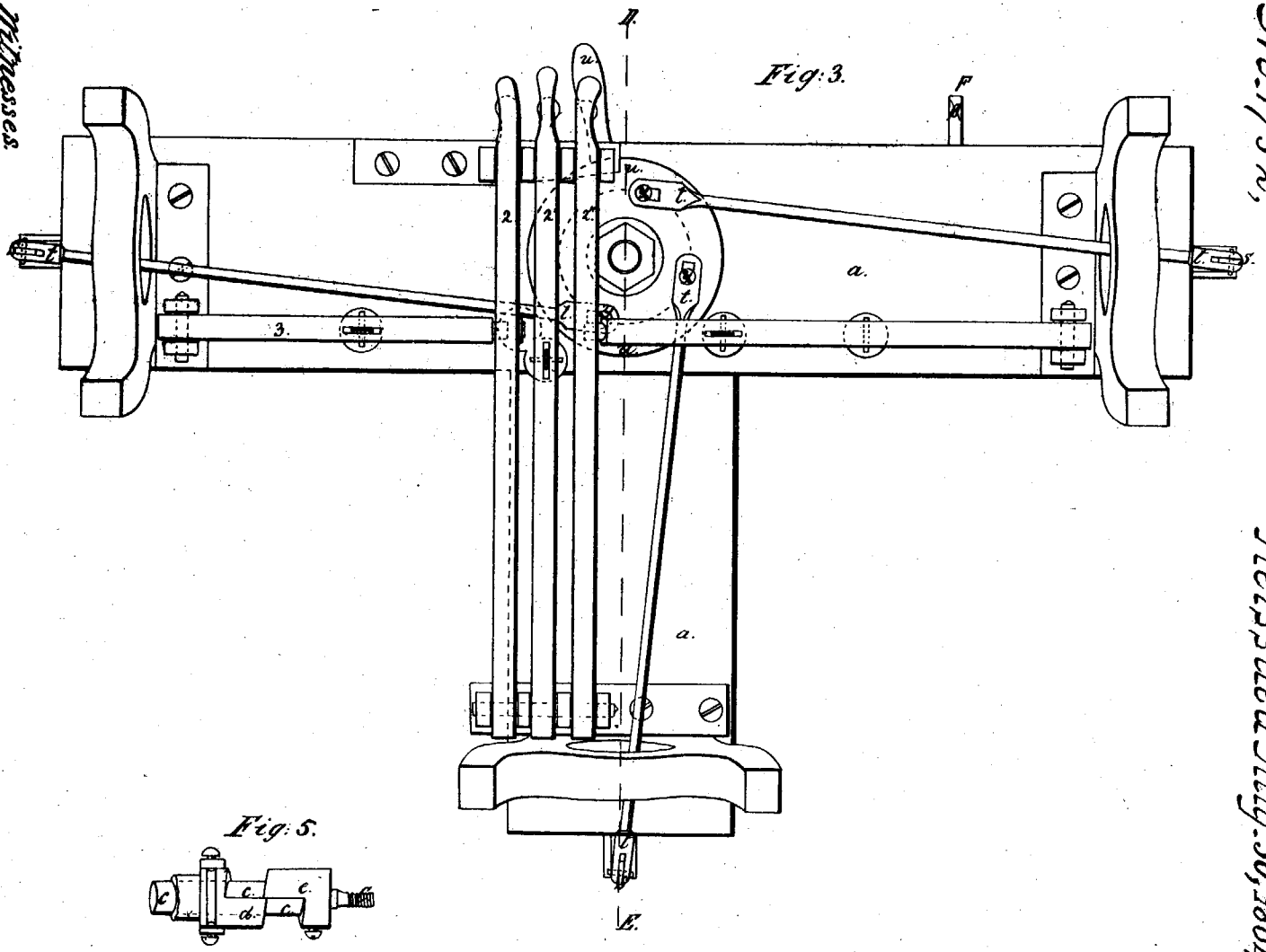
Figure 4:
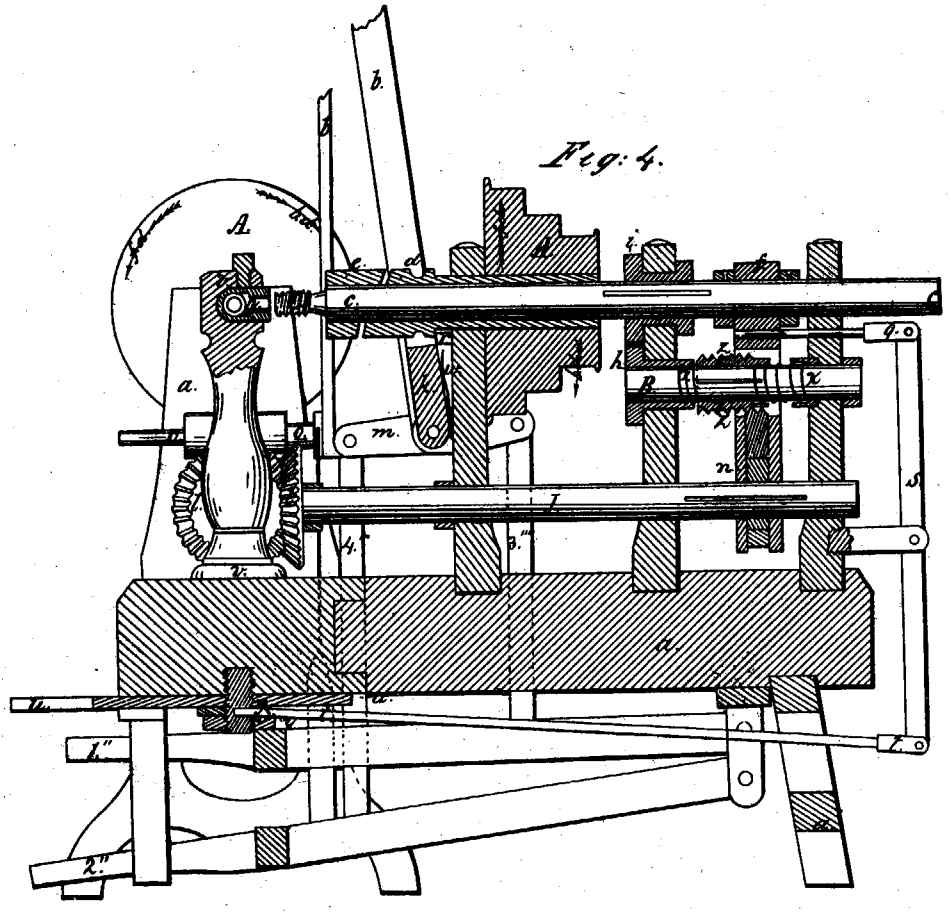

Figure 1 is an elevation of the machine; Fig. 2, a plan; Fig. 3, a reverse plan; Fig. 4, a section on the line D E, and Fig. 5 is a detail drawing of the parts *d* and *e* shown also in the other figures of the drawings.

Similar characters refer to similar parts in all the figures of the drawings.

This invention consists in so arranging and combining the several parts of the machine that it can operate at the same time on two or more ends of pipe-fittings which are located at angles with each other, (these angles being in practice generally ninety degrees,) whereby the finishing operations upon such fittings are accomplished in a more perfect manner and more expeditiously than has been done hitherto.

To enable others skilled in the art to make and use this invention, its construction and operation will now be described.

*a a* is the framing of the machine. A A A are pulleys through which motive power is applied. *c c c* are mandrels placed at angles to each other, corresponding with the angles of the fitting to be manufactured, each mandrel carrying in its end presented to the fitting a tap, C, or other tool. *e d e d e d* are clutch-couplings, one of the parts, *e*, of each being adjusted and fixed in its proper position on its mandrel by a set-screw, the other part, *d*, being free to move on the mandrel, and, extending through a bearing in the framing, is firmly secured to the pulley A. The acting-faces of each part of the clutch-coupling are complex, two of them being in an axial plane, but of different lengths, and joined together by a face inclined to the axis. Attached to each rocker-shaft *o* is a forked arm, *k*, which is moved by the rectilinear movement of the part *d* of the coupling, and communicates a similar movement to the shipper *b*, fixed to the rocker-shaft *o*, which shipper acts on any suitable and well-known driving and reversing gear, such as open and cross belts.

*i i i* are gears which are necked into bearings in the framing, and through which gears the mandrels pass, the gears partaking of the rotary motion of the mandrels, while at the same time a reciprocating movement of the mandrels is permitted by means of the well-known device of "feather and spline." Secured between two adjustable collars fixed on each mandrel is a cross-head, *f*, through which the feeding-screw *z* and shaft B pass. In the lower extremity of each cross-head is a portion of a nut, which is thrown in and out of gear with the screw *z* by means hereinafter described. The screw-shaft B receives its motion from the gear *h*, meshing into the gear *i*. Each screw-while partaking of the rotary motion of the screw-shaft, is also allowed a slight rectilinear motion against the springs *x x*, so that when the nut is brought in contact with the screw-pressure of the inclined faces of the threads against each other will, if the threads are not in such adjustment relative to each other as to fully engage, move the screw endwise until the threads of each are perfectly engaged.

*u* is a wrist-plate, having wrists *y y y* therein, from which extend the connections *t*, *s*, and *q* to the cross-heads *f*, whereby the mandrels carrying the taps may be simultaneously brought to and withdrawn from their work. One end of each connection *t* is slotted, for purposes to be more fully described hereinafter.

1 1′ 1″ and 2 2′ 2″ are levers connected by other levers, 3 3′ 4, and links 3″ 3‴ 3⁗ 4′ 4″ 4‴ to opposite ends of the arms *m m m*, which are connected with the shippers *b b b*, whereby all or any of the pulleys A are made to run in one or the other direction, respectively.

*j j j* are shafts connected together by means of bevel-gears *l* or other suitable devices, so that said shafts will work simultaneously. Secured on these shafts, so as to partake of their rotary motion and the reciprocating motion of the cross-heads, and within recesses in the cross-heads, are eccentrics *n*, encompassed by hoops *g*, on an elongation of which are the portions of nuts which work in the feed-screws *z*. A lever is fixed on one of the shafts *j*, and by raising it or depressing it the eccentrics operate the nuts in relation to their respective screws in a perfectly obvious manner.

*r r r* are springs for assisting the shippers past their neutral or dead points, and *w w w* are springs which serve to keep the couplings and pulleys forward from any accidental tendency to move in the opposite direction.

*v* is a clamp in which the steam or gas pipe fittings is secured, and is common to all parts of the machine. A fitting being secured in the clamp, and the shippers being in a vertical position, which position so acts on the driving and reversing gear that the motion of the pulleys shall be in the direction indicated by the arrows *b d*, and the lever *x* being raised, depressing the nuts so that they are not engaged in the feed-screws, the operation of the machine is as follows:

By moving the wrist-plate *u* from left to right all the tools are made to approach the work, then by depressing the lever *x* the nuts are raised to engage the screws. The motion of the pulleys is then reversed by depressing the levers 2 2′ 2″, which will cause the pulleys to rotate in the direction indicated by the arrows *f d*, and the nuts and screws engaging in consequence the mandrels advance with a rotary motion, causing the *e* part of the coupling to advance till those faces of the couplings which are in axial planes become disengaged—those of the *e* part from those of the *d* part.

When any one of the couplings becomes thus unlocked, then the inclined faces of both parts of the coupling act against each other by the continued rotary motion of the mandrel, and consequently the part *e* being secured from further advance by the engagement of the tool in or against the work, the action of the inclined faces causes the part *d* and pulleys thereon to move backward, and by that movement, communicated to the shipper, reverses the direction of motion of the pulleys which are connected with the unlocked coupling, which pulleys continue to revolve in the direction of the arrow marked *b d*, and withdraws the mandrels until the nuts run off the screws, and will then revolve without any further effect.

When all the tools have thus become disengaged from the fitting, it can be removed from the clamp and another substituted. Raise the lever *x* to depress the nuts, draw forward the mandrels by operating the wrist-plate, and otherwise proceed as before described.

To cause any one of the tools to act independently of the remainder, the same manipulation of levers must be made as before described, with this exception—viz., depress only that lever of the series 2 2′ 2″ which ultimately operates the mandrel intended to be used.

It sometimes occurs that some of the taps advance more rapidly in the "fitting" than the others on account of the slipping of the belt or from other causes, so that the advance tap begins to recede before the others have proceeded sufficiently far. Some provision is, therefore, necessary to permit these opposing motions to prevent undue strain or breakage of the machine, or when the use of one part of the machine is to be dispensed with to permit the other parts to perform their duty. This is accomplished by means of a wrist-plate or its equivalent connected to the cross-heads, or some part having the same rectilinear movement of the taps, by rods with their ends slotted, so that during the advance or reverse motion of either tap the slotted end of the connection traverses its wrist without restraint.

Any tool or tools can at any time when advancing be withdrawn before the action of the inclined faces of the clutch operates to that end by depressing the lever or levers of the series 1 1′ 1″ connected therewith, which action places the shippers in a vertical position reversing the movements.

The amount of rectilinear movement of any tool can be varied and adjusted by adjustment of the part of the clutch fixed on the mandrel, or by adjusting the position of the cross-head with regard to the feed-screw by means of the collars. It is obvious that the pitch of the feed-screw should bear a certain relation to the pitch of the thread required to be cut, and also that at the different ends of a fitting different threads and sizes may be cut.

This machine is automatic in its action in so far as that the tools proceed to their work, stop and return at the proper time, and all of them being similarly or appropriately adjusted and simultaneously operated, insures a uniformity and perfection in the manufacture of angular fittings not otherwise obtained. By means of the devices described the engagement of the nuts with the feeding-screws is at the proper times rendered absolutely certain. By means of the wrist-plate and connections the tools are all brought simultaneously to their work, saving time, and yet permit any one of the taps to be used without interfering with the operations of the other parts.

The invention is not limited to the particular mode of reversing the direction of motion of the pulleys, or of feeding the tools, or to the precise form of wrist-plate and connections herein described, as these may be varied without changing the principle of the invention. The devices are specified which are used with success in the embodiment of the invention.

What is claimed is—

A machine so organized as to be capable of operating at the same time on two or more ends of pipe-fittings, which are located at angles with each other, substantially as set forth.

MALLEABLE IRON-FITTINGS CO.,
By J. J. WALWORTH,
*President.*

Witnesses:
GEORGE L. RICE,
J. B. CROSBY.